Figure 1:
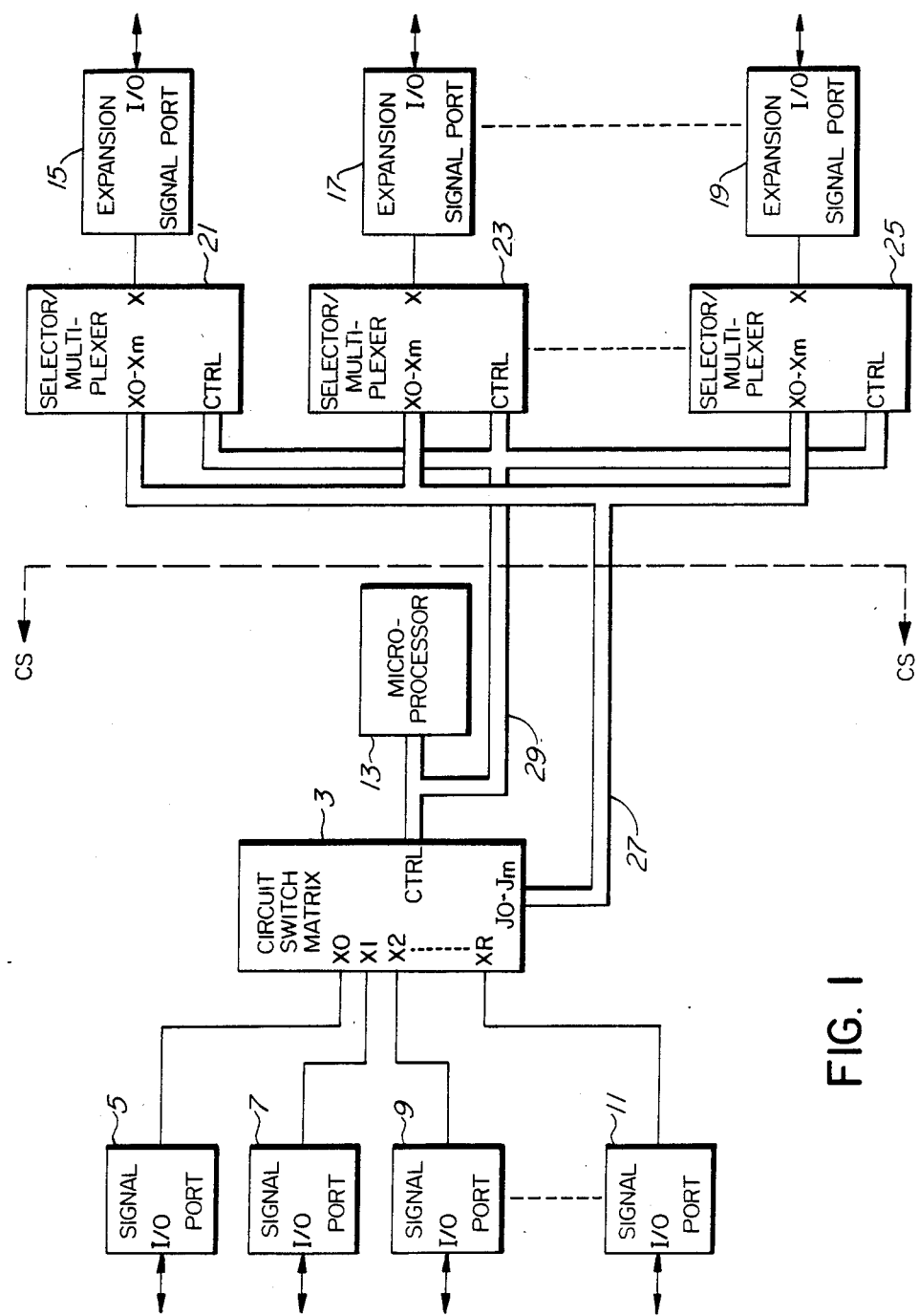

United States Patent [19]

Molnar

[11] Patent Number: 4,792,970
[45] Date of Patent: Dec. 20, 1988

[54] EXPANSION PORT FOR USE IN A COMMUNICATION SYSTEM

[75] Inventor: Gerald Molnar, Ottawa, Canada

[73] Assignee: Trillium Telephone Systems Inc., Canada

[21] Appl. No.: 840,394

[22] Filed: Mar. 17, 1986

[30] Foreign Application Priority Data

Nov. 20, 1985 [CA] Canada ................................ 495812

[51] Int. Cl.$^4$ ........................ H04M 1/60; H04Q 3/545
[52] U.S. Cl. .................................... 379/284; 379/290; 379/296
[58] Field of Search ............... 379/269, 284, 165, 290, 379/296, 250; 370/67, 85, 58, 59

[56] References Cited

U.S. PATENT DOCUMENTS

| | | | |
|---|---|---|---|
| 4,061,880 | 12/1977 | Collins et al. | 370/92 |
| 4,379,950 | 4/1983 | Ahmed | 364/514 |
| 4,530,090 | 7/1985 | Priamo et al. | 370/58 |
| 4,554,413 | 11/1985 | Pinede et al. | 379/165 |
| 4,694,452 | 9/1987 | Beckinger et al. | 370/58 |

Primary Examiner—Thomas W. Brown
Attorney, Agent, or Firm—Laff, Whitesel, Conte & Saret

[57] ABSTRACT

A system for expanding the number of signal ports accommodated by a base communication system having one or more switching circuits for interconnecting a plurality of local signal ports via a multiple line signal bus under control of a central controller. The expansion system is comprised of a plurality of expansion port circuits connected in parallel to the signal bus, for selectively interconnecting one or more respective remote signal ports to predetermined lines of the signal bus under control of the central controller. Each of the expansion port circuits preferably includes a selector/multiplexer circuit for selectively interconnecting the remote signal port with the predetermined line of the signal bus. According to a preferred embodiment of the invention, the communication system is a telephone system, such as a key telephone system or PABX, and the multiple line signal bus is comprised of a set of junctors. The plurality of local and remote signal ports can be, for instance, subscriber sets, outside telephone lines, call announce units, modems, etc. The system is inexpensive and modular such that the cost for expanding the system is incurred on a "pay as you go" basis, and is not made part of the initial expenditure for acquiring the base communication system.

13 Claims, 3 Drawing Sheets

EXPANSION PORT FOR USE IN A COMMUNICATION SYSTEM

This invention relates in general to communication systems and more particularly to a system for expanding the number of signal ports accommodated by a base communication system.

The feature of expandability of modern day communication systems, such as PABXs and key telephone systems, is becomming increasingly important in light of customer demands that initial expenditure for acquiring the system be minimized, and that additional upgrading or expansion of the system be on a "pay as you go" basis. Accordingly, it is a design objective of modern day communication system manufacturers to provide a base system with a minimum of hardware or circuitry for accommodating future expansion. In particular, it is preferred to defer the cost to the customer of all such additional hardware and circuitry until such time as he or she decides to upgrade or expand the base system.

A base system typically comprises a plurality of interface circuits for connection to local signal ports. For example, in telephone systems line and trunk circuits are utilized for interfacing subscriber sets and outside telephones with a local circuit switch matrix. Interface circuits can also be utilized for connecting data terminals and computers, etc., with the circuit switch matrix. Prior art base systems typically incorporated an additional one or more peripheral switching matrices for connection to a plurality of expansion ports, such as additional line and trunk circuits, call announce units, dial tone detectors, etc. The additional one or more switching matrices were typically connected to the circuit switch matrix via a common multiple line signal bus, such as a plurality of junctors.

The customer thus paid the extra cost of the expansion switching matrices at the time of purchasing the base system regardless of when or whether he or she decides to expand the system to incorporate the additional expansion ports.

Furthermore, because each of the one or more expansion switching matrices could accommodate only a limited number of expansion ports for connection thereto, the degree of expandability of the prior art systems was limited by the number of such additional peripheral switching matrices included with the base system. For example, in the event a four-by-six port expansion switching matrix was included in the base system for connection to four common junctors and six future expansion signal ports, and the customer is desirous of expanding his or her base system to include, for instance, an additional six call announce units and one extra outside telephone line, the prior art base system would be incapable of supporting such an expansion, since the four-by-six port matrix cannot be connected to the seven expansion signal ports.

According to the present invention, there is provided an expansion port circuit having one or more signal paths for connection to a remote signal port, such as a subscriber set, call announce unit or outside telephone line, and a selector/multiplexer circuit for connection to the multiple line signal bus and interconnecting the one or more signal paths with a predetermined one of the lines. Thus, since no additional expansion switching matrix is required in the base system, the cost to the customer for implementing system expansion is incurred on a "pay as you go" basis as opposed to being included in the purchase price of the base system itself. Also, according to the present invention, system expandability is not limited by the switching capacity of a resident expansion port matrix, as in prior art systems, since each expansion port is connected directly to the signal bus and selectively switched to a predetermined line thereof.

Referring to the example discussed above, in the event a customer decides to expand his or her base system to include an additional six call announce units and one extra telephone line, each of the call announce units and the telephone line are connected in parallel to the signal bus, and selectively switched thereto via respective expansion port circuits. Thus, expansion port signal switching is distributed among each of the additional expansion ports, instead of being localized, as in the prior art, in one or more switching matrices disposed in the base system.

Figure 2:
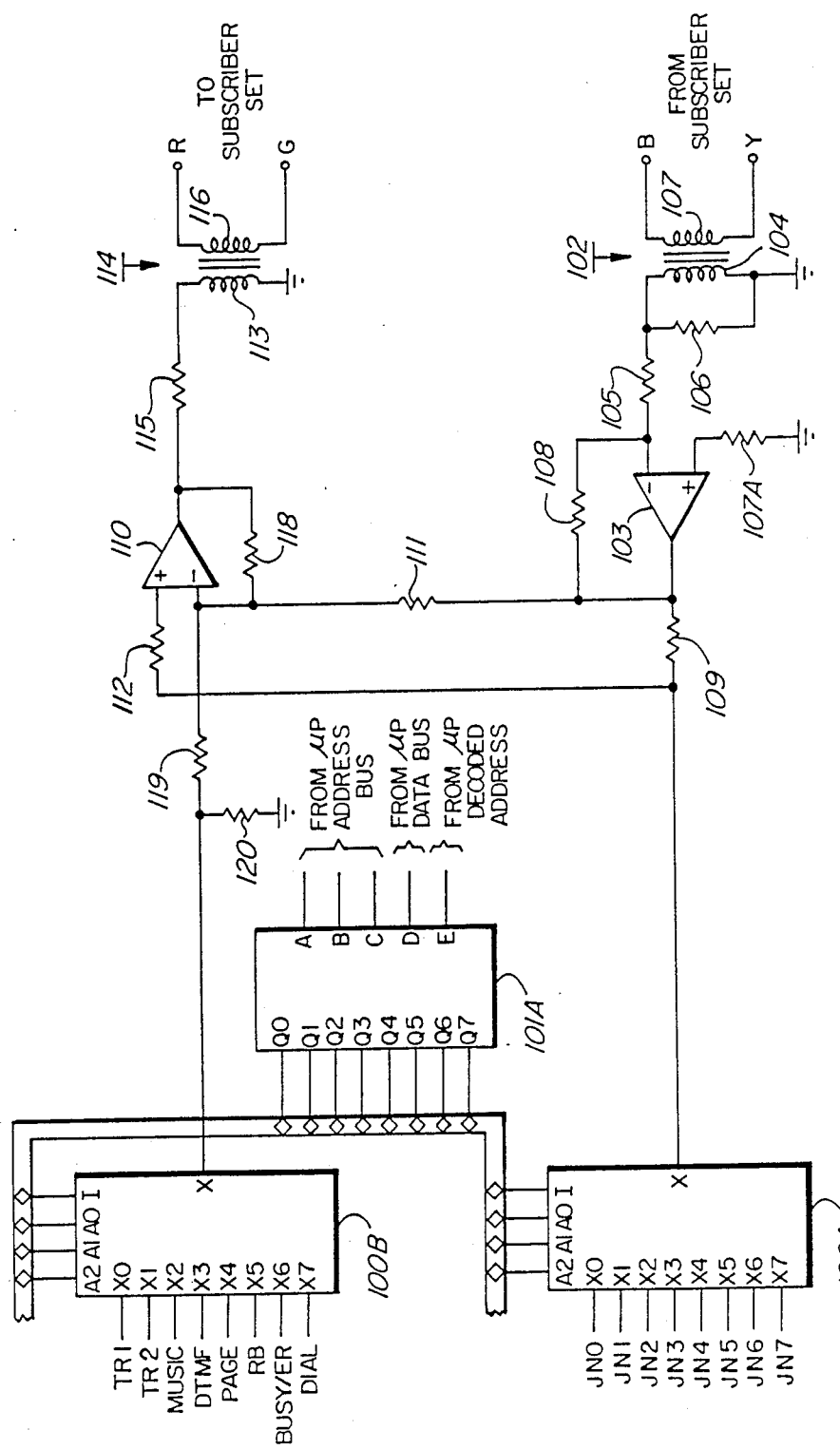
Figure 3:
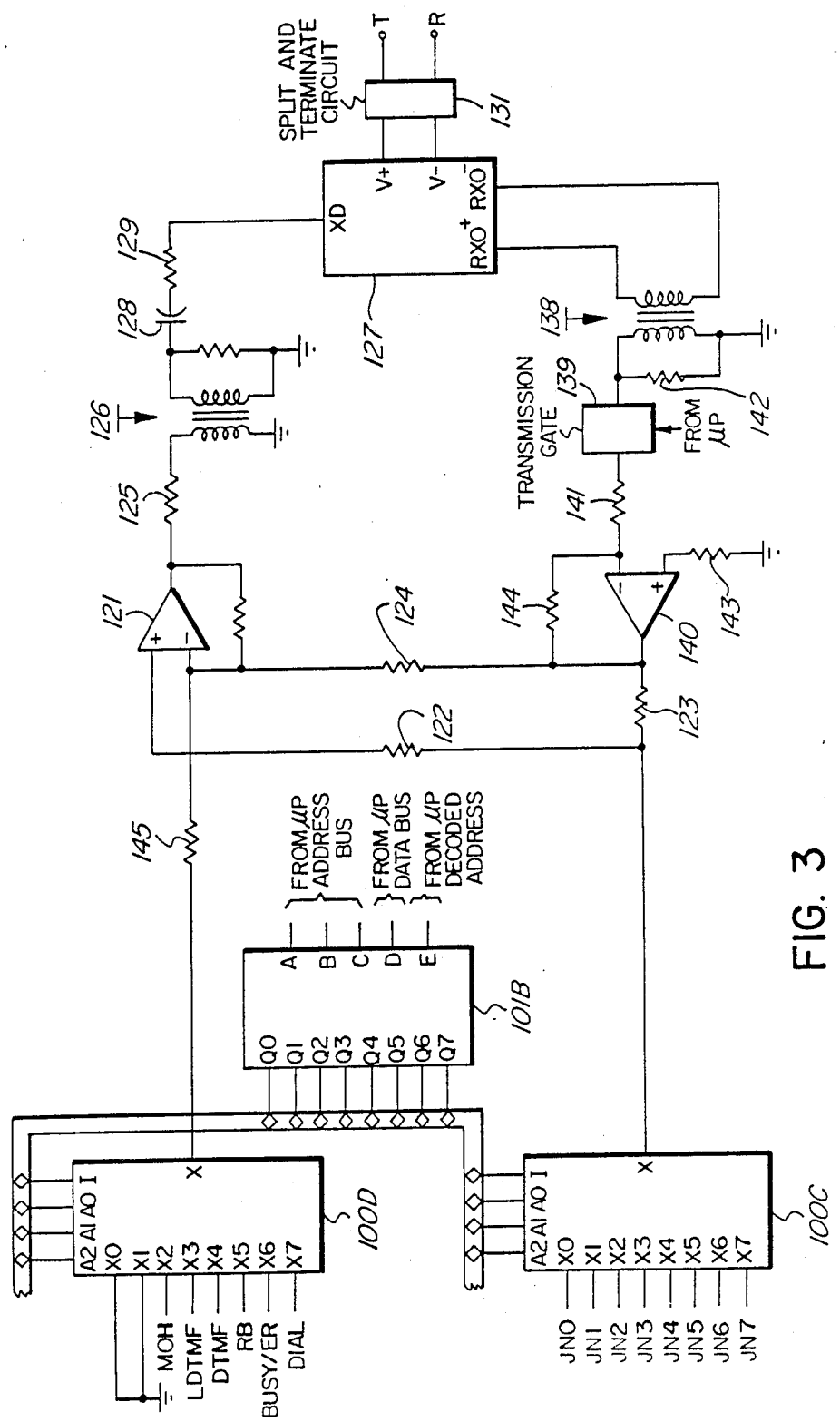

A better understanding of the invention will be obtained with reference to the detailed description below, in conjunction with the following drawings in which:

FIG. 1 is a block diagram showing a plurality of expansion ports connected to a base system according to the present invention, FIG. 2 is a schematic diagram of an expansion subscriber line interface circuit according to a preferred embodiment of the present invention, and FIG. 3 is a schematic diagram of an expansion trunk circuit according to an alternative embodiment of the present invention.

With reference to FIG. 1, a base communication system is shown generally to the left of the dashed line CS, and is comprised of a circuit switch matrix 3 for interconnecting a plurality of bidirectional signal ports 5, 7, 9,...11 under control of a central processor, such has a microprocessor 13.

Bidirectional signal ports 5, 7, 9,...11 can be, for instance, subscriber line interface circuits for connection via input/output terminals (I/O) to one or more local subscriber sets in a telephone system. Alternatively, the signal ports can be trunk circuits for connection to one or more outside telephone lines, dial tone detectors, paging circuits, tie trunks, modems, etc. All such bidirectional signal ports are well known in the communication arts, and the specific designs and construction thereof do not form part of the present invention.

A plurality of expansion signal ports, 15, 17,...19 are shown connected via respective selector/multiplexer circuits 21, 23,...25 to the circuit switch matrix 3 via a multiple line signal bus 27. Signal bus 27 can be, for instance, a plurality of junctors in a telephone system, connected to respective bidirectional terminals Xo-Xm of the selector/multiplexer circuits 21, 23,...25. Each of the selector/multiplexer circuits has a control input CTRL connected to a control bus 29 for carrying control signals generated by microprocessor 13. The control bus 29 is also connected to the circuit switch matrix 3 for controlling interconnection of various ones of the local signal ports 5, 7, 9,...11.

In operation, in order to connect a predetermined one of the expansion signal ports 15, 17,...19 to one of the local signal ports 5, 7, 9,...11, microprocessor 13 generates a series of control signals on the control bus 29 for interconnecting a predetermined one of the local signal ports 5, 7, 9,...11 to a predetermined line of bus 27, and additional control signals for interconnecting a predetermined one of the expansion signal ports 15, 17,...19 via a respective one of selector/multiplexer circuits 21, 23,...25 to the aforementioned predetermined line of signal bus 27.

Alternatively, one or more of the expansion signal ports may be interconnected in response to the microprocessor 13 generating predetermined control signals for connecting the one or more selector/multiplexer circuits to a predetermined one of the lines of signal bus 27, whereby signals are carried between the expansion signal ports without being transmitted through the circuit switch matrix 3.

Thus, it can be seen that the number of expansion ports that can be connected via respective selector/multiplexer circuits to the communication system is not limited by the switching capacity of a central peripheral switching matrix, as in the prior art. Also, since various ones of the expansion signal ports may be interconnected directly via signal bus 27, signal traffic between such peripheral ports is made independent of signal traffic in the circuit switch matrix, typically resulting in fewer incidences of circuit switch blocking.

With reference to FIG. 2, a pair of selector/multiplexers 100A and 100B are shown having bidirectional terminals X0–X7 connected to a plurality of signal carrying lines of a base communication system, such as the system described above with reference to FIG. 1. Expansion port terminals B, Y and R, G are connected to balanced lead pairs of an external subscriber set.

In particular, the X0–X7 terminals of selector/multiplexer 100A are connected to respective junctor terminals JN0–JN7 of a common signal bus, such as bus 27 discussed above with reference to FIG. 1. The X0–X7 teminals of selector/multiplexer 100B are connected to tone ringing circuits TR1 and TR2, a background source of music (MUSIC), a DTMF generator, a paging circuit (PAGE), a ring back circuit (RB), a busy/error tone generating circuit (BUSY/ER) and a dial tone generator circuit (DIAL). Such unidirectional signal circuits are all well known for use in communication systems, such as telephone systems, although the specific design and construction of such circuits does not form part of the present invention.

In operation, signals received on B and Y leads for the subscriber set, are coupled via transformer 102 to differential amplifier 103 for application to the X input of selector/multiplexer 100A, and therefrom to a predetermined one of the junctors JN0–JN7. The predetermined junctor is sselected in response to microprocessor 3 generating and applying a predetermined control signal to the A, B, C, D and E inputs of latch circuit 101A, and therefrom to the I, A0–A2 control inputs of selector/multiplexer 100A, via the Q4–Q7 outputs of latch 101A. Microprocessor 13 (FIG. 1) typically has address and data terminals thereof connected to respective address and data buses, in addition to control terminals. According to the present invention, predetermined lines of the address and data buses are used for controlling selection of the selector/multiplexers. For ease of description, such address and data lines will be referred to in general as comprising predetermined lines of the control bus 29 discussed with reference to FIG. 1, although a person skilled in the art will understand that such address and data lines typically form part of well known address and data buses. Thus, predetermined address lines of microprocessor 13 are connected to the A, B and C inputs of a latch circuit 101A, while a buffered data line of the microprocessor data bus is connected to the D input of latch circuit 101A, and an enable input E of latch circuit 101A is connected to a decoded address line of microprocessor for carrying a predetermined control signal generated by microprocessor 13 for enabling the latch circuit 101A.

A secondary coil 104 of transformer 102 is connected via resistor 105 to the inverting input of an amplifier 103, and impedance matching resistor 106 (preferably 600 ohms) is connected across the secondary coil 104. The non-inverting input of amplifier 103 is connected to ground via resistor 107A, and an output of amplifier 103 is connected to the inverting input thereof via feed back resistor 108, in a well known manner. The output of amplifier 103 is connected to the X terminal of selector/multiplexer 100A via resistor 109 and to an inverting input of amplifier 110 via input resistor 111.

Signals received from junctors JN0–JN7 via selector/multiplexer 100A are applied to a non-inverting input of amplifier 110 via the X terminal of selector/multiplexer 100A and input resistor 112. The resistance of resistors 109, 111 and 112 are chosen such that signals output from amplifier 103 are applied with equal amplitude to the inverting and non-inverting inputs of amplifier 110 so as to be cancelled therein, in a well known manner. An output of amplifier 110 is connected to a primary coil 113 of an audio transformer 114 via an output resistor 115.

Secondary coils 116 and 117 of transformers 114 and 102 respectively, are connected to the R, G and B, Y leads of a four-wire conductor connected at an opposite end to the remote subscriber set, as discussed above. Accordingly, bidirectional audio signal transmission is effected between the selector/multiplexer circuit 100A and remote subscriber set on separate unidirectional receive and transmit balanced lead pairs B, Y and R, G.

An inverting input of amplifier 110 is connected to the output thereof via feedback resistor 118 in a well known manner. Unidirectional signals, such as supervisory tone signals or music signals are received on a predetermined one of the X0–X7 terminals of selector/multiplexer 100B in response to predetermined control signals being applied to the I, A0–A2 inputs thereof. As discussed above, microprocessor 13 generates control signals on address and data buses connected thereto for application to latch circuit 101A, which in response transmits control signals to the I, A0–A2 inputs of selector/multiplexers 100A and 100B via the Q4–Q7 and Q0–Q3 outputs respectively, of latch 101A.

Supervisory signals connected to the X terminal of selector/multiplexer 100B are applied via voltage dividing resistors 119 and 120 to the inverting input of amplifier 110 for amplification thereby and transmission to the remote subscriber set.

Resistor 120 is preferably of low resistance (e.g. 2k ohms) relative to resistor 119 (e.g. 90k ohms) in order that, in the event no supervisory tones or music signals are being carried by the X terminal of selector/multiplexer 100B, the X terminal is held at a high impedance level and the voltage on the inverting input of amplifier 110 is drawn toward ground via resistor 120. In this way, proper transmission of signals, such as speech signals carried by the X terminal of selector/multiplexer 100A, is maintained in the absence of A.C. ground potential being applied to the X terminal of selector/multiplexer 100B, which ground potential is typically applied during transmission of unidirectional signals.

With reference to FIG. 3, a trunk circuit is shown for connection to the X terminals of selector/multiplexers 100C and 100D. The X0–X7 terminals of selector/multiplexer 100C are connected to junctor terminals JN0-JN7, respectively. The X0-X7 terminals of selector/multiplexer 100D are connected to various sources of unidirectional information signals. In particular, the X0 and X1 terminals are connected to ground, the X2 terminal is connected to a music on hold circuit (MOH), the X3 and X4 terminals are connected to low and normal outputs LDTMF and DTMF of a dual tone generator, the X5 terminal is connected to a RING BACK circuit (RB), the X6 terminal is connected to a busy and error tone signal generating circuit (BUSY/ER), and the X7 terminal is connected to the dial tone generator (DIAL). As discussed above with reference to FIG. 2, the aforementioned unidirectional information signaling source circuits are well known in the art and the specific construction thereof does not form part of the present invention.

A latch circuit 101B has A, B and C inputs thereof connected to the aforementioned predetermined lines of the address bus of microprocessor 13 (FIG. 1), the D input is connected to a buffered line of the microprocessor data bus, and the enable input E is connected to a further decoded address line of microprocessor 13 for carrying a control signal for enabling latch 101B. The decoded address lines discussed with reference to the expansion line and trunk circuits of FIGS. 2 and 3 relate, of necessity, to separate addresses of microprocessor 13 for separately enabling the latches 101A and 101B.

The Q0-Q3 outputs of latch circuit 101B are connected to the I, A0, A1 and A2 inputs of selector/multiplexer 100D, respectively. The Q4-Q7 output terminals of latch circuit 101B are connected to the I, A0, A1 and A2 inputs respectively of selector/multiplexer 100C.

In operation, a selected one of the junctors JN0-JN7 is connected via selector/multiplexer 100C to the X terminal in response to control signals generated by microprocessor 13 and applied via latch circuit 101B to the I, A0-A2 inputs of the selector/multiplexer 100C, as discussed above with reference to FIG. 2. The signals received from the selected junctor and appearing on the X terminal are applied to a non-inverting input of differential amplifier 121 via input resistor 122, and via resistors 123 and 124 to the inverting input of amplifier 121. The values of resistors 122, 123 and 124 are chosen such that signals appearing on the X terminal are differentially received by amplifier 121 and applied therefrom via output resistor 125 to an audio transformer 126 and coupled thereacross for reception by a transmit terminal XD of an electronic telephone circuit 127, via an AC coupling capacitor 128 and resistor 129. An impedance matching resistor 130 is connected across a secondary coil of transformer 126 in the usual manner.

Telephone circuit 127 performs well known hybrid functions such as generation of sidetone etc., and transmits the received signals differentially from V+ and V− terminals thereof. The V+ and V− terminals of telephone circuit 127 are connected via a split and terminate circuit 131 to tip and ring terminals T and R, for connection to an outside telephone line. The split and terminate circuit 131 provides circuitry for protecting telephone circuit 127 against transient voltages due to lightning strikes and other high voltage transient signals which may appear on the line.

Signals receive from an external central office or PBX are applied to the V+ and V− terminals of circuit 127 via the tip and ring leads T and R and circuit 131. The telephone circuit 127 performs a two-to-four wire signal conversion such that the received signals are applied to the RXO+ and RXO− terminals thereof. The signals thus applied, are coupled across audio transformer 138 and applied to an inverting input of differential amplifier 140 via transmission gate 139 and input resistor 141.

Microprocessor 13 generates a control signal for application to the transmission gate 139 according to a method which does not form part of the present invention, for disabling gate 139 in the event of unidirectional information signals being transmitted to the outside line via the tip and ring leads T and R in the absence of bidirectional signals being carried by the line.

In particular, in the event the tip and ring leads T and R of the outside line are split and terminated via circuit 131 and music on hold (MOH) is being provided thereto, gate 139 is disabled via the microprocessor control signal for preventing music signals on the tip and ring leads T and R from being fed back thereto via amplifier 140.

An impedance matching resistor 142 is connected across a secondary coil of transformer 138 in the usual manner. A non-inverting input of amplifier 140 is connected to ground via resistor 143 and an output of amplifier 140 is connected to the inverting input thereof via a feedback resistor 144 in a well known manner.

Thus, signals received from the tip and ring leads T and R, by telephone circuit 127, are applied to the RXO+ and RXO− terminals thereof and coupled via transformer 138 for amplification via amplifier 140 and applied therefrom to the X terminal of selector/multiplexer 100C via resistor 123, and therefrom to a predetermined one of the junctors JN0-JN7 for connection to a further one of the expansion signal ports or via circuit switch matrix 3 (FIG. 1) to one of the local signal ports 5, 7, 9,...11.

Supervisory tone signals and background music signals received on one of the X2-X7 terminals of selector/multiplexer 100D, and appearing on the X terminal thereof, are applied to the inverting input of amplifier 121 via input resistor 145.

Thus, supervisory tone signals and music are applied to the outside line without requiring utilization of circuit switch matrix 3. Hence, it can be seen that provision of supervisory tone signals and background music or music on hold is independent of signal traffic in the circuit switching matrix 3.

A person skilled in the art understanding the present invention may conceive of other embodiments or variations thereof. For instance, the communication system described herein according to the preferred embodiment is a telephone system, such as a key system or PABX. However, the system can be for instance, a digital switching system such as a PACX or other type of well known communication system.

Also, whereas the preferred embodiment incorporates a separate supervisory signalling system (i.e. information signals and music signals are not carried by the circuit switch matrix 3), the base communication system can alternatively be configured to perform supervisory tone and music signal switching via the circuit switch matrix 3 in a well known manner.

All such embodiments and variations are believed to be within the sphere and scope of the present invention as defined by the claims appended thereto.

I claim:

1. In a communication system comprised of a central controller for generating control signals, a common multiple line signal bus, and one or more switching circuits connected to said central controller and said signal bus for receiving said control signals and in response connecting a plurality of local signal ports to said signal bus for establishing bidirectional communication between said ports via said signal bus; an expansion port circuit comprised of a selector/multiplexer connected to respective lines of said signal bus, to said central controller and to a remote signal port, for receiving predetermined ones of said control signals and in response connecting said remote signal port to a predetermined one of said respective lines, whereby a communication path is established between said remote signal port and a predetermined one of said plurality of local signal ports connected to said predetermined one of said respective lines.

2. An expansion port circuit as defined in claim 1, further including a latch circuit for receiving control signals generated by said central controller and applying said control signals to predetermined control inputs of said selector/multiplexer.

3. An expansion port circuit as defined in claim 1, wherein said communication system is a telephone system, said common multiple line signal bus is comprised of a plurality of junctors, and said selector multiplexer includes a plurality of bidirectional signal carrying terminals for connection to respective ones of said junctors and a further bidirectional terminal for connection to said remote signal port.

4. An expansion port circuit as defined in claim 3, further comprising a hybrid circuit for translating bidirectional signals between said further bidirectional terminal and separate unidirectional transmit and receive terminals of said remote signal port.

5. An expansion port circuit as defined in claim 4, further including an additional selector/multiplexer connected to one or more unidirectional signal sources, to said central controller, and to said unidirectional transmit terminal, for receiving additional predetermined ones of said control signals and in response connecting a predetermined one of said signal sources to said transmit terminal, whereby a unidirectional communication path is established between said predetermined unidirectional signal source and said remote signal port.

6. An expansion port circuit as defined in claim 4, wherein said remote signal port is a subscriber set and said hybrid circuit is further comprised of: a pair of transmit and receive amplifiers connected to said further bidirectional terminal of said selector/multiplexer and to a pair of transmit and receive audio transformers connected to said transmit and receive terminals, respectively, for coupling unidirectional audio signals between said further bidirectional terminal and said transmit and receive terminals, thereby facilitating bidirectional signal communication between said selector/multiplexer and said remote subscriber set.

7. An expansion port circuit as defined in claim 4, wherein said remote signal port is an outside telephone line and said hybrid circuit is further comprised of: a pair of transmit and receive amplifiers connected to said further bidirectional terminal of said selector/multiplexer and in series with a pair of transmit and receive audio transformers and an electronic telephone circuit connected to said outside telephone line, for coupling unidirectional audio signals between said further bidirectional terminal and said electronic telephone circuit, whereby facilitating bidirectional signal communication between said selector/multiplexer and said outside telephone line.

8. An expansion port circuit as defined in claim 5, wherein said remote signal port is a subscriber set and said hybrid circuit is further comprised of: a pair of transmit and receive amplifiers conneceed to said further bidirectional terminal of said selector/multiplexer and to a pair of transmit and receive audio transformers connected to said transmit and receive terminals, respectively, for coupling unidirectional audio signals between said further bidirectional terminal and said transmit and receive terminals, thereby facilitating bidirectional signal communication between said selector/multiplexer and said remote subscriber set.

9. An expansion port circuit as defined in claim 5, wherein said remote signal port is an outside telephone line and said hybrid circuit is further comprised of: a pair of transmit and receive amplifiers connected to said further bidirectional terminal of said selector/multiplexer and in series with a pair of transmit and receive audio transformers and an electronic telephone circuit connected to said outside telephone line, for coupling unidirectional audio signals between said further bidirectional terminal and said electronic telephone circuit, thereby facilitating bidirectional signal communication between said selector/multiplexer and said outside telephone line.

10. An expansion port circuit as defined in claim 3, further comprised of:
(a) a first amplifier for receiving and amplifying signals carried by a predetermined selected one of said junctors and appearing on said further bidirectional signal terminal, and transmitting said amplified signals for reception by said remote signal port, and
(b) a second amplifier for receiving and amplifying signals generated by said remote signal port and applying said generated signals to said further bidirectional signal terminal for transmission to said selected junctor via said selector/multiplexer.

11. An expansion port circuit as defined in claim 10, further including circuitry for cancelling said signals received from said remote signal port by said second amplifier from being transmitted to said remote signal port via said first amplifier.

12. An expansion port circuit as defined in claim 3, further including a latch circuit for receiving control signals generated by said central controller and applying said control signals to predetermined control inputs of said selector/multiplexer.

13. An expansion port circuit as defined in claim 10, further including a latch circuit for receiving control signals generated by said central controller and applying said control signals to predetermined control inputs of said selector/multiplexer circuit.

* * * * *